United States Patent
Hayashi (10) Patent No.: US 7,881,716 B2
(45) Date of Patent: Feb. 1, 2011

(54) MOBILE PHONE

(75) Inventor: Kazushige Hayashi, Higashiosaka (JP)

(73) Assignee: Kyocera Corporation, Kyoto (JP)

( * ) Notice: Subject to any disclaimer, the term of this patent is extended or adjusted under 35 U.S.C. 154(b) by 1207 days.

(21) Appl. No.: 11/492,048

(22) Filed: Jul. 25, 2006

(65) Prior Publication Data

US 2007/0026859 A1   Feb. 1, 2007

(30) Foreign Application Priority Data

Jul. 26, 2005   (JP)  ............................. 2005-215485

(51) Int. Cl.
*H04W 4/00*   (2009.01)
(52) U.S. Cl. ................. 455/432.1; 455/435.1; 455/436; 455/445
(58) Field of Classification Search ...... 455/435.2–445; 370/331–333
See application file for complete search history.

(56) References Cited

U.S. PATENT DOCUMENTS

| | | | |
|---|---|---|---|
| 2004/0202141 A1* | 10/2004 | Sinivaara et al. | 370/338 |
| 2005/0003822 A1* | 1/2005 | Aholainen et al. | 455/445 |
| 2005/0070280 A1* | 3/2005 | Jung et al. | 455/434 |

FOREIGN PATENT DOCUMENTS

JP   2001-217847   8/2001

* cited by examiner

*Primary Examiner*—Dai A Phuong
(74) *Attorney, Agent, or Firm*—Morrison & Foerster LLP (57) ABSTRACT

When acquiring a PRL, a mobile phone judges whether the newly acquired PRL contains a base station satisfying a selection condition specifying (i) a communication mode, (ii) whether a base station available via a roaming service is selectable, and (iii) a data communication mode. On judging that such a base station is contained, the mobile phone retains the current selection condition. On judging, on the other hand, that such a base station is not contained, the mobile phone changes the selection conditions so that all the base stations contained in the PRL are made selectable for communication.

8 Claims, 4 Drawing Sheets

| INDEX | ACQ_TYPE | CH1 | CH2 | CH3 | CH4 | ... | CH31 |
|---|---|---|---|---|---|---|---|
| 0 | CDMA/AMPS | B | | | | | |
| 1 | CDMA/AMPS | A | | | | | |
| 2 | AMPS | B | | | | | |
| 3 | AMPS | A | | | | | |
| ... | | | | | | | |
| 36 | PCS | 25 | 325 | 50 | | | |

FIG. 2B

| INDEX | SID | NID | NEG/PREF | GEO | PRI | ACQ_INDEX | ROAM_IND | SUBNET |
|---|---|---|---|---|---|---|---|---|
| 0 | 4097 | 65535 | Pref | NEW | SAME | 36 | RM | 0 |
| 1 | 4500 | 65535 | Pref | SAME | MORE | 36 | RM | 0 |
| 2 | 2042 | 65535 | Pref | SAME | SAME | 2 | RM | 0 |
| 3 | 251 | 65535 | Pref | SAME | SAME | 3 | RM | 0 |
| 4 | — | — | Pref | NEW | SAME | 0 | FR | 400 |

FIG. 3A

| INDEX | RoamingMode | Communication Mode | | | Home/Roaming | Flag |
|---|---|---|---|---|---|---|
| 0 | PCS Home | PCS | | | Home | ON |
| 1 | Automatic | PCS | Cellular | Analog | Home/Roaming | OFF |
| 2 | Analog Only | | | Analog | Home/Roaming | OFF |
| 3 | Cellular Only | | Cellular | | Home/Roaming | OFF |
| 4 | Roaming Only | PCS | Cellular | Analog | Roaming | OFF |

FIG. 3B

| INDEX | Hybrid Mode | Data Communication Mode | | Flag |
|---|---|---|---|---|
| 0 | Hybrid | 1x | EVDO | ON |
| 1 | 1x Only | 1x | | OFF |
| 2 | EVDO Only | | EVDO | OFF |

FIG. 4

MOBILE PHONE

This application is based on an application No. 2005-215485 filed in Japan, the contents of which are hereby incorporated by reference.

BACKGROUND OF THE INVENTION (1) Field of the Invention

The present invention relates to a mobile phone, and especially to processing performed by a mobile phone upon writing a PRL (Preferred Roaming List).

(2) Description of the Related Art

Some telecommunications carriers have a mutual agreement to provide a service called roaming, which is the extending of connectivity in another carrier's service area. The roaming service allows users to use their mobile phones via a communication system (i.e. base station) of a carrier other than the carrier with which the users are registered. A list called PRL indicates which of available communication systems the mobile phone should use by priority, and also indicates other information regarding the respective communication systems.

With the use of PRL, the users are allowed to set up a selection condition, such as a communication mode, that needs to be satisfied by a communication system to be selectable. The mobile phone selects a communication system to be used, based on the PRL stored therein and the selection condition set by the user. That is, by setting up a selection condition specifying a specific communication mode, the user can ensure that the mobile phone conducts communications with a communication system in the desired communication mode.

For example, the user may set up such a selection condition that the mobile phone does not use any communication system available via a roaming service. Use of a roaming communication system generally incurs extra charges. By setting a selection condition for not using a roaming service, the user can save such extra charges.

The PRL stored in a mobile phone needs to be updated in the case where the telecommunications carriers build a new base station or remove an existing base station. In such a case, information contained in the PRL may no longer be consistent with the current state of communication systems. In order to maintain the accuracy of the PRL, each time a change is made to the communication systems, the mobile phone newly acquires a PRL reflecting the change, and selects a communication system to use based on the newly acquired PRL. A method for updating data stored in a mobile device from an external source is disclosed in JP Patent Application Publication No. 2001-217847.

It should be noted, however, that the newly acquired PRL may not contain any communication system satisfying the selection condition set by the user.

Suppose, for example, the user specifies an analog communication mode as a selection condition, whereas all the communication systems contained in the newly acquired PRL are capable of digital communications and not capable of analog communications.

In the case where, as described above, the PRL does not contain any communication system satisfying the user-set selection condition, the mobile phone cannot select any communication system. As a consequence, the mobile phone will be unable to carry out communications.

In order to avoid such an undesirable occurrence, upon acquisition of a new PRL, a state-of-the-art mobile phone automatically resets the selection condition set by the user, so that all the communication systems are made selectable. This arrangement serves to prevent that the mobile phone will be unable to conduct communications.

It should be noted, however, according to the above arrangement, each time a new PRL is acquired, the user-set selection condition is automatically discarded and changed to a predetermined state. This change of the selection condition takes place without informing the user or without user's consent.

According to OTAPA (Over-the-air Parameter Administration), the mobile phone automatically acquires a new PRL from an external source without requiring any user operation. Thus, the PRL acquisition and the change of selection condition take place while the user is not aware of it. As a result, it is possible that while the user believes that the mobile phone sets up communications using a communication system satisfying the selection condition set by the user, a communication system actually used is the one not desired by the user.

SUMMARY OF THE INVENTION

In order to address the above problems, the present invention aims to provide a mobile phone capable of retaining the user set selection condition as long as possible without causing such a situation that the mobile phone is unable to conduct communications.

In an attempt to achieve the above aim, the present invention provides a mobile phone for selecting and communicating with a base station that satisfies a selection condition. The selection is made based on roaming information indicating a plurality of base stations and a type of each base station. The mobile phone includes: a receiving unit operable to receive a selection condition indicating a type of base station specified by a user; a storing unit operable to store the received selection condition; an acquiring unit operable to acquire roaming information; a roaming information storage unit operable to store the acquired roaming information; a judging unit operable to judge, on acquisition of the roaming information by the acquiring unit, whether any base station indicated in the roaming information satisfies the selection condition stored in the storage unit; and a control unit operable, when the judging unit judges that none of the base stations indicated in the roaming information satisfies the selection condition stored in the storage unit, to modify the selection condition so that at least one of the base stations indicated in the roaming information satisfies a new selection condition.

With the above structure, the mobile phone according to the present invention makes a judgment, upon acquisition of new roaming information such as a PRL, as to whether the newly acquired PRL contains a base station satisfying the user-set selection condition. Judging that such a base station is contained in the new PRL, the mobile phone retains the user-set selection condition without any change.

On the other hand, judging that the newly acquired PRL does not contain any base station satisfying the user-set selection condition, the mobile phone changes the user-set selection condition so as to avoid that the mobile phone is unable to conduct communications.

Consequently, the mobile phone according to the present invention retains the user-set selection conditions as long as possible, and changes the user-set selection condition only when necessary to avoid that mobile phone becomes unable to communicate.

Here, the type of base station may relate to a communication mode. The receiving unit may be operable to receive the selection condition indicating one or more communication modes specified by the user. The judging unit may be operable to make the judgment depending on whether any base station indicated in the roaming information supports any of said one or more communication modes indicated in the selection condition.

With this structure, it is ensured that the mobile phone sets up communications with a base station in a communication mode desired by the user as long as possible, even after a PRL is newly acquired.

Suppose, for example, that the user sets up such a selection condition that the mobile phone conducts communications only in the digital communication mode. In this case, it is ensured that analog mode communications, which are normally slower, are avoided until a new PRL is acquired and the new PRL requires the selection condition to be changed. Similarly, in addition, suppose that the user sets up a selection condition specifying an EVDO (Evolution Data Only) data communication mode, which is normally faster than a 1× (CDMA2000 1×) data communication mode. In this case, it is ensured that data communications are carried out in EVDO unless a new PRL is acquired and the new PRL requires the selection condition to be changed.

Here, the control unit may be operable, when the judging unit judges negatively, to modify the selection condition so that the new selection condition indicates no specification of any particular communication mode.

The control unit performs processing to appropriately change the selection condition, so that the newly acquired PRL contains a base station satisfying the selection conditions as changed. Here, the mobile phone having the structure described above changes the selection condition to simply specify all the communication modes. As a result, the load imposed on the mobile phone for changing the selection condition is reduced.

Here, the type of base station may relate to whether a respective base station is available via a roaming service. The receiving unit may be operable to receive the selection condition indicating whether a base station that is available via a roaming service is specified by the user to be selectable. The judging unit may be operable to make the judgment depending on whether a base station indicated in the roaming information is available via a roaming service.

With this structure, the selection condition set by the user is retained as long as possible, even after a new PRL is acquired. As a consequence, unless the new PRL requires the selection condition to be changed, the mobile phone selects a base station to use, depending on whether the base station is available via a roaming service.

More specifically, for example, once the user sets up a selection condition so as not to use a base station that is available via a roaming service, the setting is retained until a new PRL is acquired and the new PRL requires the selection condition to be changed. As a consequence, communications with a base station available via a roaming service is avoided as much as possible.

Here, the control unit may be operable, when the judging unit judges negatively, to modify the selection condition so that the new selection condition indicates no specification as to whether a base station available via a roaming service is selectable.

Here, the mobile phone having the structure described above changes the selection condition only when the judgment unit judges that no base station contained in the PRL satisfies the user-set selection condition. As a result of the change, all the base stations are made selectable, regardless of whether the respective base stations are available via a roaming service. That is, the mobile phone retains the selection condition set by the user as long as it is possible without causing the undesirable occurrence that the mobile phone is unable to establish communications.

Here, the mobile phone may further include: a holding unit operable to store, under control by the control unit, the selection condition initially specified by the user before the modification by the control unit; and a user specification judgment unit operable, when the acquiring unit acquires roaming information after the modification of the user-specified selection condition by the control unit, to judge whether any base station indicated in the newly acquired roaming information satisfies the user-specified selection condition stored in the holding unit. The control unit may be operable, when the user specification judging unit judges positively, to modify the new selection condition to be identical to the user-specified selection condition stored in the holding unit, irrespective of the judgment by the judging unit.

That is, the control unit changes the user-set selection condition if required as a result of acquiring a new PRL. When a yet another PRL is later acquired and the yet another PRL contains a base station satisfying the selection condition initially set by the user, the control unit puts the selection condition back to the state initially set by the user. This arrangement saves the trouble of the user to set the same selection condition again.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

Embodiment

The following describes a mobile phone consistent with an embodiment of the present invention, with reference to the accompanying drawings.

The mobile phone according to the present invention acquires and stores a PRL (Preferred Roaming List) illustrated in FIGS. 2A and 2B, which will be described later. The mobile phone then selects a communication system to be used, in accordance with the selection conditions shown in Set Mode tables illustrated in FIGS. 3A and 3B, which will be described later.

More specifically, the PRL illustrated in FIG. 2 indicates available communication systems for the mobile phone to communicate with, and also indicates information regarding the respective communication systems. In this example, the PRL indicates communication modes of the respective communication systems. The user of the mobile phone is allowed to set a selection condition for a communication system to satisfy in order to be selectable.

For example, the user may set up such a selection condition that a communication system performing digital communications will be selected. The mobile phone conducts communications with a communication system having a highest priority among all the selectable communications systems contained in the PRL. Note that the priorities are indicated in a PRI column 216 of the table shown in FIG. 2B, which will be described later.

<Structure>

Figure 1:
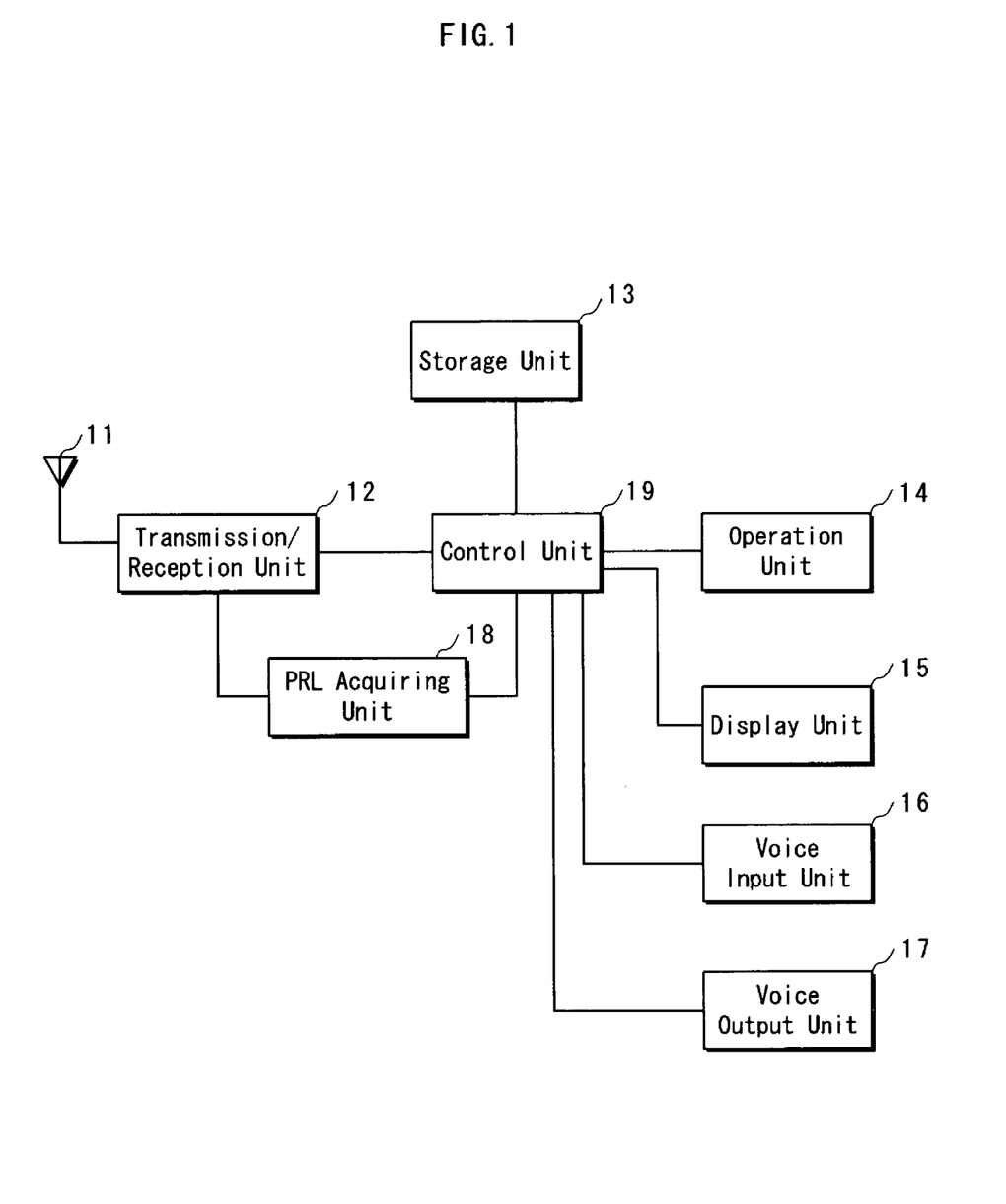
FIG. 1 is a functional block diagram of a mobile phone according to the present invention.

FIG. 1 is a functional block diagram of the mobile phone according to the present invention.

As illustrated in the figure, the mobile phone according to the present invention includes an antenna 11, a transmission/reception unit 12, a storage unit 13, an operation unit 14, a display unit 15, a voice input unit 16, a voice output unit 17, a PRL acquiring unit 18, and a control unit 19.

The antenna 11 is a rod antenna that can be freely extended from and retracted into the main body of the mobile phone. The antenna 11 is used to receive/transmit a radio wave.

The transmission/reception unit 12 is composed of an RF circuit used to receive/transmit a radio signal. More specifically, the transmission/reception unit 12 modulates data received from the control unit 19 and transmits the modulated data via the antenna 11. In addition, the transmission/reception unit 12 receives data via the antenna 11, demodulates the received data, and passes the demodulated data to the control unit 19. The data used herein refers to voice data of a call and a control signal received/transmitted upon acquisition of a PRL.

The storage unit 13 is composed of a rewritable non-volatile memory and stores a PRL and selection conditions set by the user.

The operation unit 14 is composed of various keys including a call-start key, a call-end key, and numeric keys. The operation unit 14 is used to receive user operations for setting a selection condition and placing a call, and output a signal indicative of the received operations to the control unit 19.

The display unit 15 is composed of a liquid crystal panel. In response to a signal received from the control unit 19, the display unit 15 displays various information, such as text strings, images, and the current time.

The voice input unit 16 is composed of a microphone. The voice input unit 16 is used to convert voice input made by the user into an audio signal and output the resulting audio signal to the control unit 19.

The voice output unit 17 is composed of a speaker. The voice output unit 17 is used to receive a signal output from the control unit 19 and produce voice output.

The PRL acquiring unit 18 is composed, for example, of a CPU (Central Processing Unit), ROM (Read Only Memory), and RAM (Random Access Memory). Under an instruction received from the control unit 19, the PRL acquiring unit 18 acquires a PRL using a predetermined protocol, such as OTASP (over-the-air Service Provisioning), OTAPA (over-the-air Parameter Administration), or IOTA (IP-based over-the-air Handset Configuration Management). Although not illustrated in the figure, the PRL acquiring unit 18 may be connected to a PC (Personal Computer) or the like via a connection tool and acquire a PRL from the PC.

The control unit 19 is composed, for example, of a CPU, ROM, and RAM. The control unit 19 operates in accordance with a program stored on the ROM to control the processing performed by the PRL acquiring unit 18 for acquiring a PRL and also control the processing for changing the selection conditions.

<Data>

PRL

The following describes a PRL stored on the storage unit 13, with reference to the drawings.

Figure 2A:
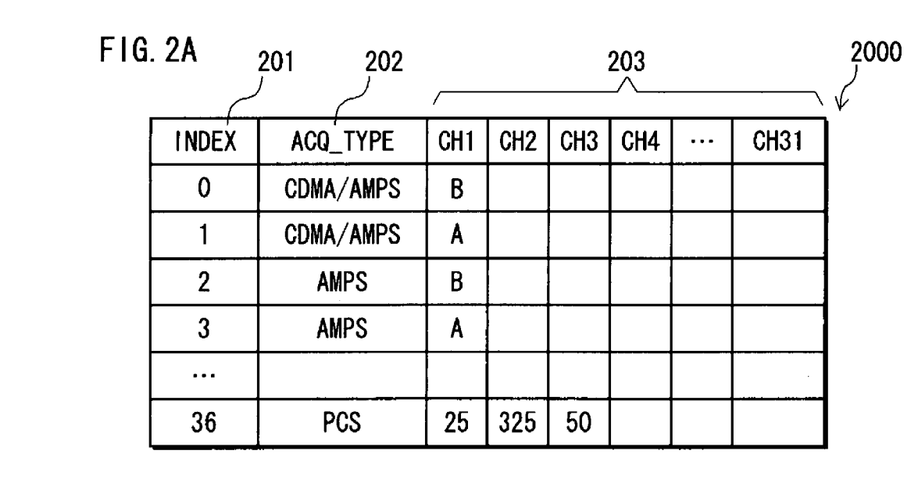
FIGS. 2A and 2B are views illustrating a PRL.
Figure 2B:
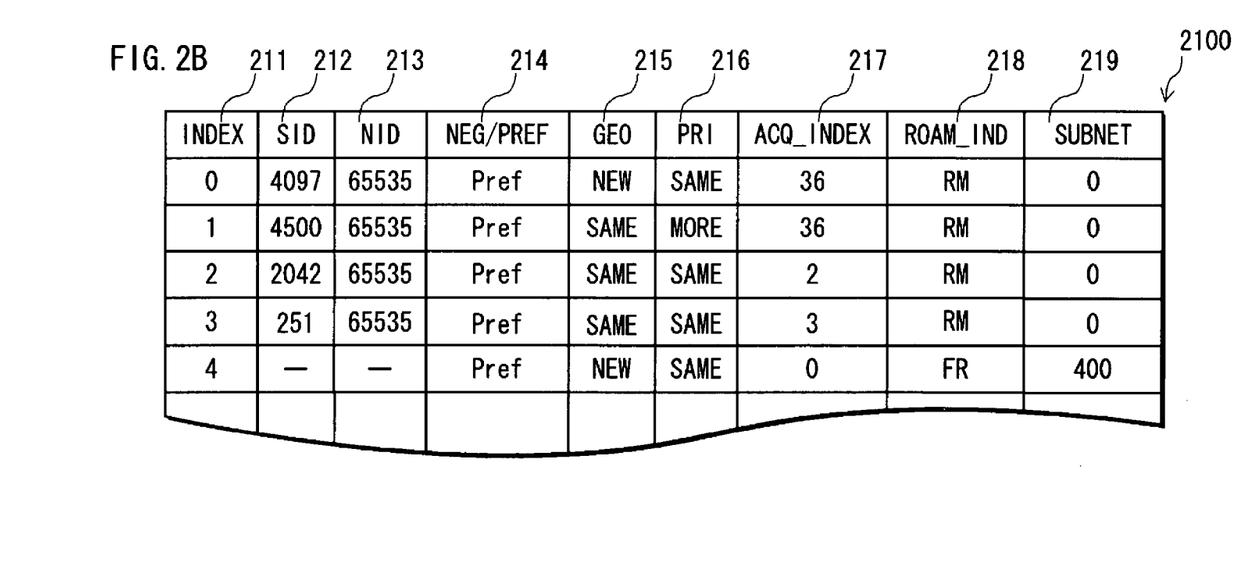

FIGS. 2A and 2B illustrates a PRL.

The PRL is composed of an acquisition table 2000 illustrated in FIG. 2A and a system table 2100 illustrated in FIG. 2B. The acquisition table 2000 contains a listing of communication systems available for the mobile phone to use, and also contains information about the communication modes supported by the respective communication systems. The system table 2100 contains information used for identifying individual communication systems.

The acquisition table 2000 illustrated in FIG. 2A is composed of an INDEX column 201, an ACQ_TYPE column 202, and a CHANNEL column 203.

The INDEX column 201 stores INDEX numbers serially assigned to records contained in the acquisition table 2000.

The ACQ_TYPE column 202 stores, for each record, 4-bit data indicating a communication mode of a corresponding communication system. For example, the ACQ_TYPE set to the value "1" indicates that the communication system supports analog mode communications compliant with AMPS (Advanced Mobile Phone Service). The ACQ_TYPE set to the value "4" indicates "CDMA/AMPS" which means that the communication system supports digital mode communications compliant with CDMA (Code Division Multiple Access) as well as analog mode communications compliant with AMPS, and the CDMS is selected by priority. The ACQ_TYPE set to the value "6" indicates that the communication system supports digital mode communications compliant with PCS (Personal Communication Services).

The CHANNEL column 203 stores, for each record, frequency channels used by a corresponding communication system to carry out communications.

The system table 2100 illustrated in FIG. 2B is composed of an INDEX column 211, an SID column 212, an NID column 213, an NEG/PREF column 214, a GEO column 215, a PRI column 216, an ACQ_INDEX column 217, a ROAM_IND column 218, and a SUBNET column 219.

The INDEX column 211 stores INDEX numbers serially assigned to records contained in the system table 2100.

The SID column 212 stores, for each record, a 15-bit ID number uniquely identifying a corresponding communication system.

The NID column 213 stores, for each record, a network ID whose default value is "65535".

The NEG/PREF column 214 stores, for each record, single-bit data indicating whether the communication system identified by a corresponding SID is available (i.e. preferred) for the mobile phone to use or not available (negative). The NEG/PREF set to the value "0" indicates "Neg", which means that the communication system is not available for the mobile phone to use. The NEG/PREF set to the value "1" indicates "Pref", which means that the communication system is available for the mobile phone to use.

The GEO column 215 stores, for each record, single-bit data indicating a geographic area covered by a corresponding communication system. The GEO set to the value "1" indicates "NEW", whereas the GEO set to the value "0" indicates "SAME". The "SAME" means that a corresponding communication system is located within the same geographic area covered by the communication system of an immediately previous record. The "NEW" indicates that a corresponding communication system covers a different geographic area than that covered by the communication system of an immediately previous record. Thus, the "NEW" indicates a boundary between geographic areas. When already in communications, the mobile phone attempts to select a communication system with the highest priority among communication systems covering the same geographic area with the communication system currently in communication.

The PRI column 216 stores, for each record, single-bit data indicating a priority level assigned to a corresponding communication system. The PRI set to the value "1" indicates "MORE", which means that a higher priority is assigned to the communication system of the current record than that assigned to the communication system of an immediately following record covering the same geographic area as indicated in the GEO column 215. The PRI set to the value "0" indicates "SAME", which means that the same priority is assigned to the communication systems of the current and immediately following records covering the same geographic area.

Note that the control unit 19 discards the value stored in the PRI column 216 for the last one of the records corresponding to the communication systems covering the same geographic area.

The ACQ_INDEX column 217 stores, for each record, one of the index numbers stored in the INDEX column 201 of the acquisition table 2000 to indicate a communication mode supported by the communication system identified by a respective SID. For example, the ACQ_INDEX set to the value "36" indicates that the communication system supports PCS, which is the communication mode indicated by the record in the acquisition table 2000 with the index number "36".

The ROAM_IND column 218 stores, for each record, data indicating whether the communication system identified by a corresponding SID is available via a roaming service. The ROAM_IND set to the value "0" indicates that the communication system is available via a roaming service. The ROAM_IND set to the value "1" indicates that the communication system is available without a roaming service. The ROAM_IND set to the value "2" indicates that the communication system is available via Flashing Roam.

The SUBNET column 219 stores, for each record, a subnet ID. In the case of a communication system supporting EVDO (Evolution Data Only) data communications, the SID and NID columns 212 and 213 are not used but the SUBNET column 219 is referenced instead. In the example illustrated in FIG. 2B, the mobile phone judges that the communication system supports EVDO data communications if no number is stored in the SID and NID columns 212 and 213, as in the record with the INDEX number "4".

<Set Mode>

Figure 3A:
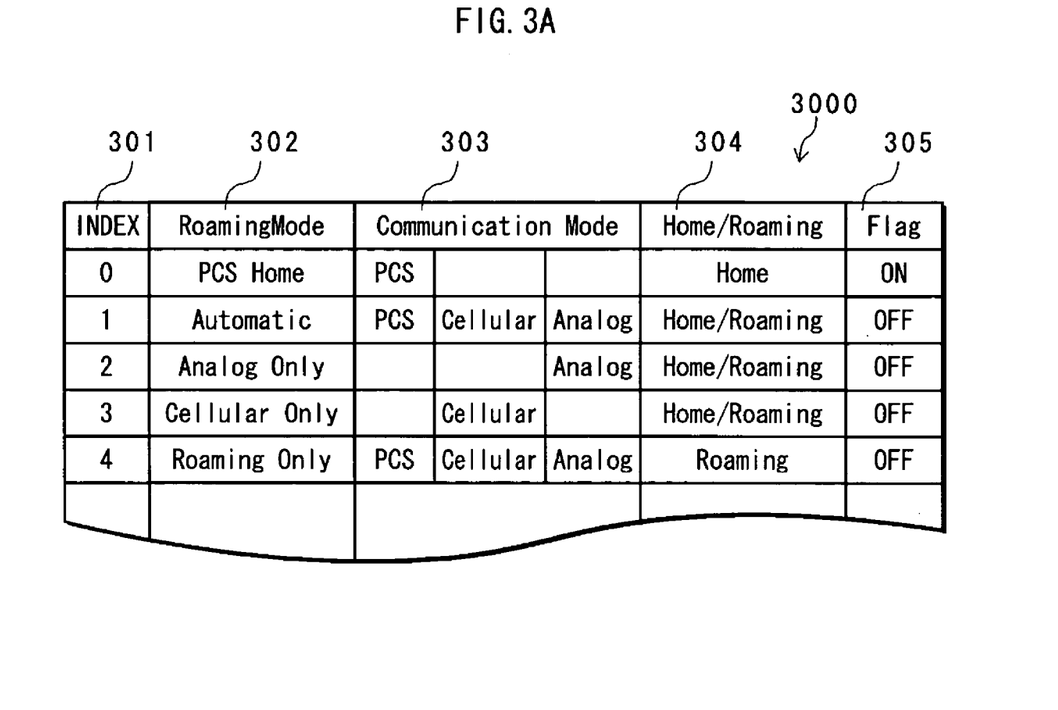
FIGS. 3A and 3B are views illustrating examples of Set Mode tables.
Figure 3B:
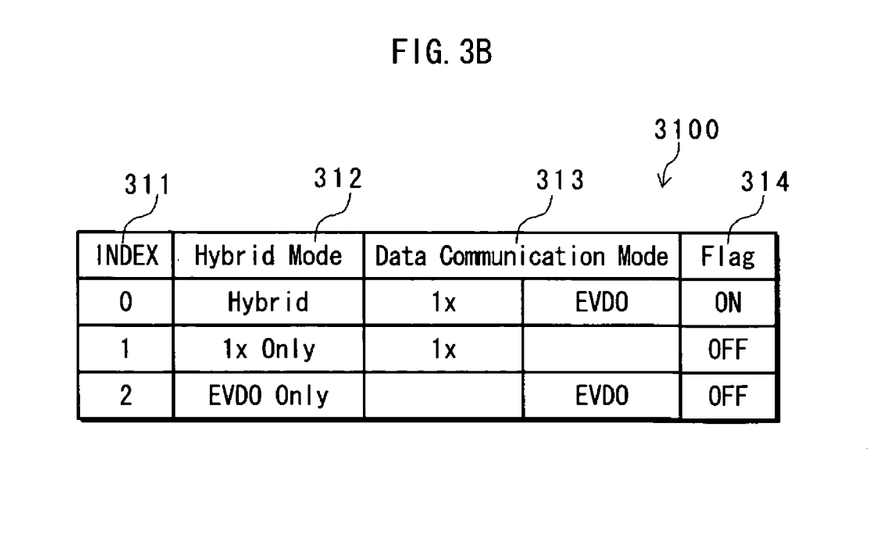

FIG. 3 are views illustrating examples of Set Mode tables stored in the storage unit 13.

The user is allowed to set a selection conditions via the operation unit 14, so as to cause the mobile phone to select and use an intended one of communication systems contained in the PRL. More specifically, the user can set a selection condition by choosing a combination of (i) the communication mode, (ii) the data communication mode of a communication system to be selected, and (iii) home information indicating whether a communication system available via a roaming service is selectable. The Set Mode table shows a listing of selection conditions that the user can choose.

FIG. 3A is a view illustrating an example of a Set Mode table 3000 in the case where the user sets a selection condition by choosing a combination of one ore more communication modes and home information.

As illustrated in FIG. 3A, the Set Mode table 3000 is composed of an INDEX column 301, a Roaming Mode column 302, a Communication Mode column 303, a Home/Roaming column 304, and a Flag column 305.

The INDEX column 301 stores a plurality of INDEX numbers sequentially assigned to selection conditions contained in the Set Mode table 3000. The user can choose any of the selection conditions corresponding to one of the INDEX numbers.

The Roaming Mode column 302 stores the names of the respective selection conditions. The user is allowed to modify the names of the selection conditions.

The Communication Mode column 303 stores, for each selection condition, information indicating one or more communication modes specified. For example, the selection conditions assigned with the INDEX number "1" has the name "PCS Home" and specifies the PCS mode. The selection condition assigned with the INDEX number "2" has the name "Automatic" and specifies all communication modes. Note that the user can modify the selection conditions so as to specify different communication modes than the ones currently shown in the Communication Mode column 303.

The Home/Roaming column 304 stores, for each selection condition, information indicating whether a communication system available via a roaming service is selectable or not. For example, the selection condition called "PCS Home" specifies "Home", as shown in the Home/Roaming column 304, which indicates that no communication systems available via a roaming service is selectable. The selection condition called "Automatic" specifies, as shown in the Home/Roaming column 304, "Home/Roaming" which indicates that any communication system is selectable regardless of whether the communication system is available via roaming service or not.

The Flag column 305 stores, for each selection condition, single-bit data (i.e. flag) indicating whether the selection condition is currently chosen by the user to be active. For example, when the flag is set to the value "1", the selection condition is currently chosen by the user to be active and thus is "ON". On the other hand, when the flag is set to the value "0", the selection condition is not currently chosen by the user to be active and thus is "OFF".

FIG. 3B is a view illustrating an example of a Set Mode table 3100 in the case where the user sets a selection condition by choosing a combination of one or more data communication modes.

As illustrated in FIG. 3B, the Set Mode table 3100 is composed of an INDEX column 311, a Hybrid Mode column 312, a Data Communication Mode column 313, and a Flag column 314.

The INDEX column 311 stores INDEX numbers serially assigned to selection conditions contained in the Set Mode table 3100. The user can choose any of the selection conditions corresponding to one of the INDEX numbers.

The Hybrid Mode 312 stores the names of the respective selection conditions. The user is allowed to modify the names of the selection conditions.

The Data Communication Mode column 313 stores, for each selection condition, one or more data communication modes specified. For example, the selection condition assigned with the INDEX number "0" has the name "Hybrid" and specifies all the data communication modes. The selection condition assigned with the INDEX number "1" has the name "1× Only" and specifies the 1× (CDMA2000 1×) data communication mode only.

Similarly to the Flag column 305 illustrated in FIG. 3A, the Flag column 314 stores, for each selection condition, single-bit data (i.e. flag) indicating, whether the selection condition is currently chosen by the user to be active.

<Operation>

The following describes the operation of the mobile phone having the above-described structure.

Figure 4:
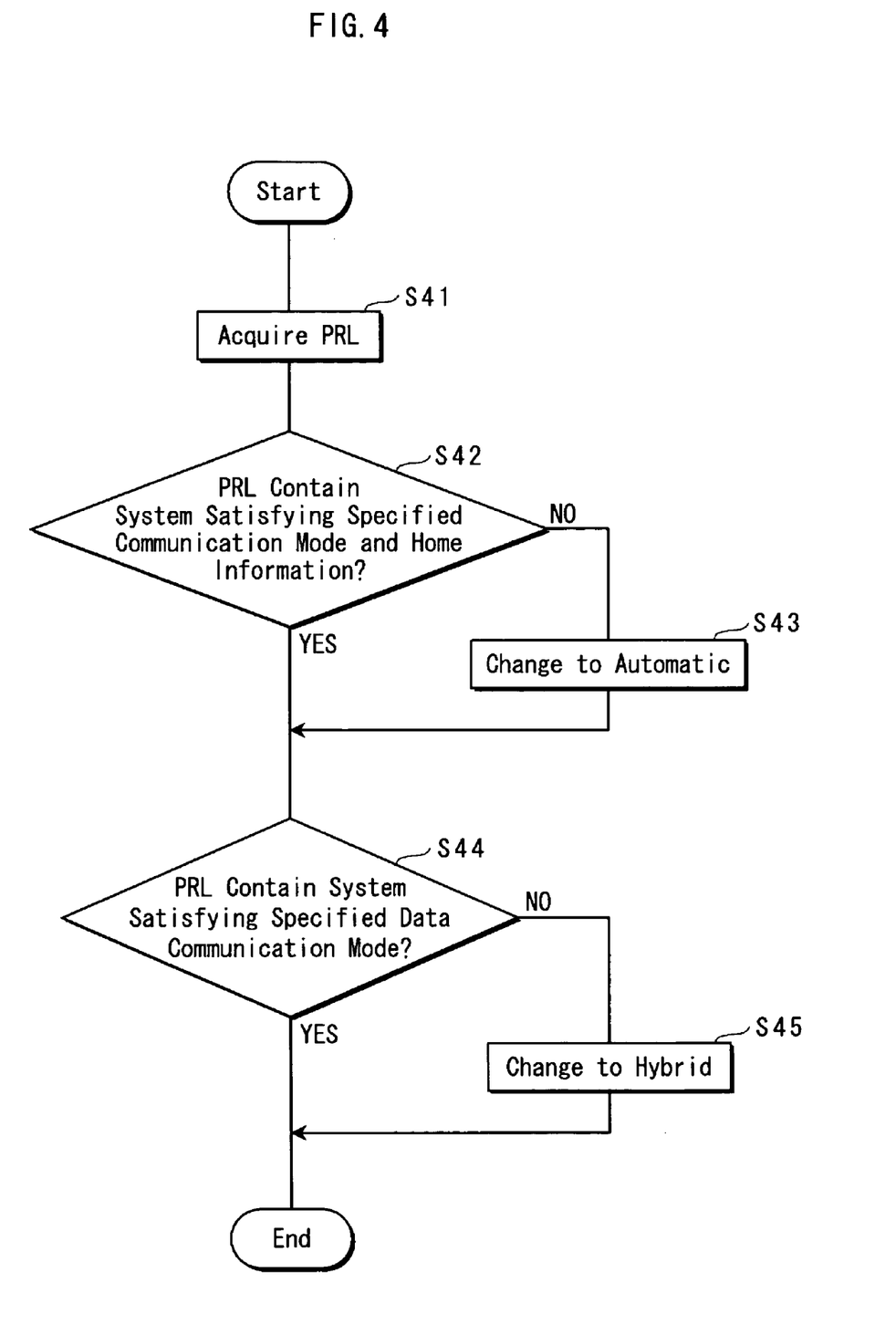
FIG. 4 is a flowchart of processing steps performed by a control unit 19 to change a selection condition set by a user.

FIG. 4 is a flowchart of processing performed by the control unit 19 to change the selection conditions currently set to be active by the user.

As illustrated in the figure, the control unit 19 issues, during the time the mobile phone is in a standby status, an instruction to the PRL acquiring unit 18 to acquire a PRL using the OTAPA protocol (S41). Upon the acquisition, the control unit 19 judges whether the newly acquired PRL contains any communication system satisfying the communication mode and home information specified by the currently active selection condition (S42).

If it is judged in the step S42 that such a communication system is not contained (S42: NO), the control unit 19 changes the currently active selection condition to the selection condition having the name "Automatic" shown in the Roaming Mode column 302 (S43). More specifically, the control unit 19 sets the flag of the currently active selection condition to "OFF", and then sets the flag of the selection condition having the name "Automatic" to "ON".

After changing the currently active selection condition in the steps S42 and S43, the control unit 19 then judges whether the newly acquired PRL contains any communication system satisfying the data communication mode designated by the currently active selection condition shown in the Set Mode table 3100 (S44).

When judging that such a commutation system is not contained (S44: NO), the control unit 19 switches the currently active selection condition to the selection condition having the name "Hybrid" (S45). More specifically, the control unit 19 sets the flag of the currently active selection condition to "OFF", and then sets the flag of the selection condition having the name "Hybrid" to "ON".

After changing the currently active selection condition in the steps S44 and S45, the control unit 19 terminates the processing for changing the selection condition initially set to be active by the user.

<Supplemental Note>

Up to this point, the mobile phone according to the present invention has been described by way of a specific embodiment. It should be appreciated, however, that the present invention is not limited to the mobile phone described in the above embodiment and various modifications including the following may be made without departing form the gist of the present invention.

(1) According to the above embodiment, when changing the selection conditions initially set to be active by the user, the control unit 19 activates the selection conditions named "Automatic" and "Hybrid". Alternatively, it is applicable that the control unit 19 creates such a selection condition that the newly acquired PRL contains a communication system satisfying the newly created selection condition.

(2) According to the above embodiment, no specific processing is performed after the control unit 19 changes the user-set selection conditions to the selection conditions called "Automatic" and "Hybrid". Alternatively, however, the storage unit 13 may store the selection conditions initially set to be active by the user before changing to the new selection conditions.

After causing the storage unit 13 to store the user-set selection conditions, the control unit 19 sets to activate different selection conditions. When a new PRL is acquired later, the control unit 19 judges whether any communication system contained in the newly acquired PRL satisfies the selection conditions stored in the storage unit 13. If the judgment results in the affirmative, it is applicable to change the currently active selection conditions called "Automatic" and "Hybrid" back to the user-set selection conditions stored in the storage unit 13.

With this arrangement, the user is saved the trouble of setting the same selection conditions over and over each time a newly acquired PRL contains a communication system satisfying the selection conditions originally set by the user. As a consequence, the user's trouble for making the selection condition setting is reduced.

(3) According to the above embodiment, each selection condition is a combination of a communication mode, a data communication mode, and home information. Alternatively, however, each selection condition may include any other information items in addition to or instead of the items mentioned above.

In addition, the items of selection conditions that can be set by the user are not limited to the above-mentioned three items, which are a communication mode, a data communication mode, and home information. For example, each selection condition may be composed of one or two of the three items.

(4) According to the above embodiment, the mobile phone sets up communications with a communication system selected based on a PRL. Alternatively, however, the present invention includes, within its scope, a mobile phone that sets up communications with a communication system selected based on other information regarding available communication systems.

(5) According to the above embodiment, the processing illustrated in FIG. 4 is performed when a PRL is acquired through OTAPA. Alternatively, however, the processing described above may be performed on acquisition of a PRL through OTASP, IOTA, or from connected via a connection tool.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A mobile phone for selecting and communicating with a base station that satisfies a selection condition, the selecting being made based on roaming information indicating a plurality of base stations and a type of each base station, the mobile phone comprising:

a receiving unit operable to receive the selection condition indicating a type of base station specified by a user;

a storing unit operable to store the received selection condition;

an acquiring unit operable to acquire roaming information;

a roaming information storage unit operable to store the acquired roaming information;

a judging unit operable to judge, on acquisition of the roaming information by the acquiring unit, whether any base station indicated in the acquired roaming information satisfies the selection condition stored in the storage unit; and a control unit operable, when the judging unit judges that none of the base stations indicated in the acquired roaming information satisfies the selection condition stored in the storage unit, to modify the selection condition so that at least one of the base stations indicated in the acquired roaming information satisfies a new selection condition, wherein the type of base station relates to a communication mode, the receiving unit is operable to receive the selection condition indicating one or more communication modes specified by the user, the judging unit is operable to make the judgment depending on whether any base station indicated in the roaming information supports any of said one or more communication modes indicated in the selection condition, and the control unit is operable, when the judging unit judges negatively, to modify the selection condition so that the new selection condition indicates no specification of any particular communication mode.

2. The mobile phone according to claim 1, wherein the type of base station relates to whether a respective base station is available via a roaming service, the receiving unit is operable to receive the selection condition indicating whether a base station available via a roaming service is specified by the user to be selectable, and the judging unit is operable to make the judgment depending on whether a base station indicated in the roaming information is available via a roaming service.

3. The mobile phone according to claim 2, wherein the control unit is operable, when the judging unit judges negatively, to modify the selection condition so that the new selection condition indicates no specification as to whether a base station available via a roaming service is selectable.

4. A mobile phone for selecting and communicating with a base station that satisfies a selection condition, the selecting being made based on roaming information indicating a plurality of base stations and a type of each base station, the mobile phone comprising:

a receiving unit operable to receive the selection condition indicating a type of base station specified by a user;

a storing unit operable to store the received selection condition;

an acquiring unit operable to acquire roaming information;

a roaming information storage unit operable to store the acquired roaming information;

a judging unit operable to judge, on acquisition of the roaming information by the acquiring unit, whether any base station indicated in the acquired roaming information satisfies the selection condition stored in the storage unit;

a control unit operable, when the judging unit judges that none of the base stations indicated in the acquired roaming information satisfies the selection condition stored in the storage unit, to modify the selection condition so that at least one of the base stations indicated in the acquired roaming information satisfies a new selection condition;

a holding unit operable to store, under control by the control unit, the selection condition initially specified by the user before the modification by the control unit; and a user specification judgment unit operable, when the acquiring unit acquires the roaming information after the modification of the user-specified selection condition by the control unit, to judge whether any base station indicated in a newly acquired roaming information satisfies the user-specified selection condition stored in the holding unit, wherein the control unit is operable, when the user specification judging unit judges positively, to modify the new selection condition to be identical to the user-specified selection condition stored in the holding unit, irrespective of the judgment by the judging unit.

5. The mobile phone according to claim 4, wherein the type of base station relates to a communication mode, the receiving unit is operable to receive the selection condition indicating one or more communication modes specified by the user, and the judging unit is operable to make the judgment depending on whether any base station indicated in the roaming information supports any of said one or more communication modes indicated in the selection condition.

6. The mobile phone according to claim 5, wherein the control unit is operable, when the judging unit judges negatively, to modify the selection condition so that the new selection condition indicates no specification of any particular communication mode.

7. The mobile phone according to claim 4, wherein the type of base station relates to whether a respective base station is available via a roaming service, the receiving unit is operable to receive the selection condition indicating whether a base station available via a roaming service is specified by the user to be selectable, and the judging unit is operable to make the judgment depending on whether a base station indicated in the roaming information is available via a roaming service.

8. The mobile phone according to claim 7, wherein the control unit is operable, when the judging unit judges negatively, to modify the selection condition so that the new selection condition indicates no specification as to whether a base station available via a roaming service is selectable.

* * * * *